(12) United States Patent
Huang

(10) Patent No.: US 8,001,667 B2
(45) Date of Patent: Aug. 23, 2011

(54) APPARATUS FOR HOLDING LENS HOLDER

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 691 days.

(21) Appl. No.: 12/122,527

(22) Filed: May 16, 2008

(65) Prior Publication Data
US 2009/0013515 A1    Jan. 15, 2009

(30) Foreign Application Priority Data

Jul. 13, 2007 (CN) .......................... 2007 1 0201072

(51) Int. Cl.
*B25B 27/14* (2006.01)
(52) U.S. Cl. ..................... 29/281.1; 29/281.4; 29/281.5; 29/281.6
(58) Field of Classification Search ................. 29/281.1, 29/281.4, 281.5, 281.6
See application file for complete search history.

(56) References Cited

U.S. PATENT DOCUMENTS

| 5,391,230 A * | 2/1995 | Pastecki et al. | 118/503 |
| 5,897,108 A * | 4/1999 | Gordon et al. | 269/50 |
| 6,047,958 A * | 4/2000 | Marinkovic | 269/43 |

* cited by examiner

*Primary Examiner* — Joseph J Hail
*Assistant Examiner* — Shantese McDonald
(74) *Attorney, Agent, or Firm* — Altis Law Group, Inc.

(57) ABSTRACT

An apparatus (10) for holding lens holders includes a first board (14) and a second board (16). The first board includes a plurality of through slots (146) defined therein. The second board includes a base portion (160) and a plurality of elongated protrusions (162) for insertion in and sliding in the respective slots. The protrusions extend from the base portion. The first board and the second board are attached to each other with the protrusions inserted in the slots. The first board and the second board cooperatively form a plurality of receptacles between the first inner surfaces in the slots and the first surface of the protrusions. A platform (12) with one of the first board and the second board are secured thereon. A driving device (20) is configured for driving the other one of the first board and the second board to move relative to the one secured on the table to change a size of the receptacles.

14 Claims, 8 Drawing Sheets

APPARATUS FOR HOLDING LENS HOLDER

BACKGROUND

1. Field of the Invention

The present invention relates to apparatuses for holding lens holders, and particularly, to an apparatus for holding lens holders in automatic assembly operations.

2. Description of Related Art

With the development of the optical imaging technology, image capturing devices, such as digital cameras and mobile phones, are widely used in electronic devices.

Most lens modules used in the cameras are assembled by manually rather than by machine. During the assembling process, optical elements (e.g. lenses, spaces, filters) are assembled into a lens holder one by one. However, manual operations have the deficiency of rather inefficient productivity. That is, only one lens module may be assembled at a time. Clearly, automatic lens module assembly operations would provide greater efficiency because multiple lens modules could be assembled in a single step.

Therefore, what is needed is an apparatus for holding multi lens holders in automatic assembly operations.

SUMMARY

An apparatus for holding lens holders includes a first board and a second board. The first board includes a plurality of through slots defined therein. The first board has a first inner surface and an opposite second inner surface in each of the slots. A plurality of spaced grooves is defined in each of the first inner surfaces. A second board includes a base portion and a plurality of elongated protrusions for insertion in and sliding in the respective slots. The protrusions extend from the base portion. Each of the protrusions has a first surface facing the corresponding first inner surface and an opposite second surface facing the corresponding second inner surface. A plurality of grooves is defined in the first surface. The grooves of the protrusions are aligned with the respective grooves in the first surface. The first board and the second board are attached to each other with the protrusions inserted in the slots. The first board and the second board cooperatively form a plurality of receptacles between the first inner surfaces in the slots and the first surface of the protrusions. A platform with one of the first board and the second board are secured thereon. A driving device is configured for driving the other one of the first board and the second board to move relative to the one secured on the table to change a size of the receptacles.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Reference will now be made to the drawings to describe in detail the preferred embodiments of the present apparatus for holding lens holders in automatic assembly operations.

Figure 1:
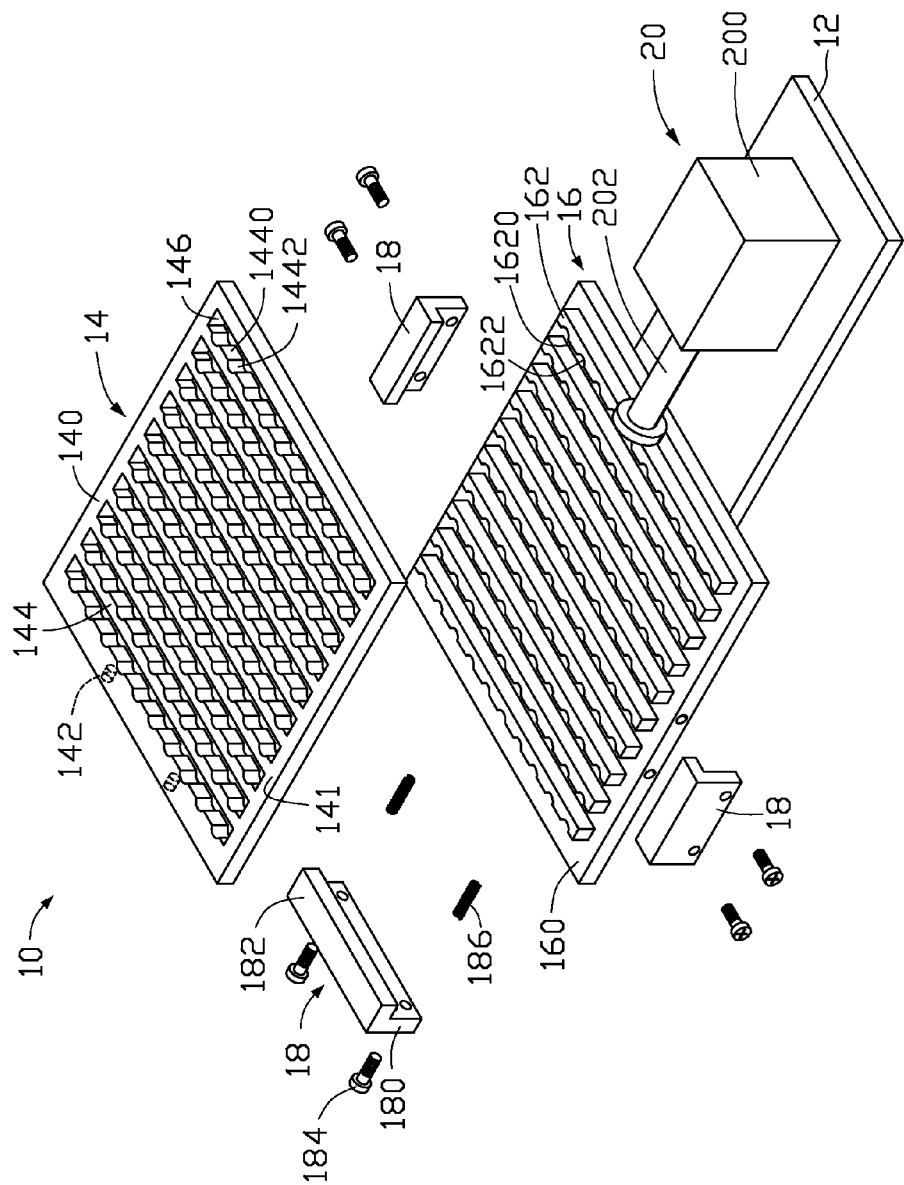
FIG. 1 is an explored perspective view of an apparatus for holding lens holder in accordance with a first embodiment.
Figure 2:
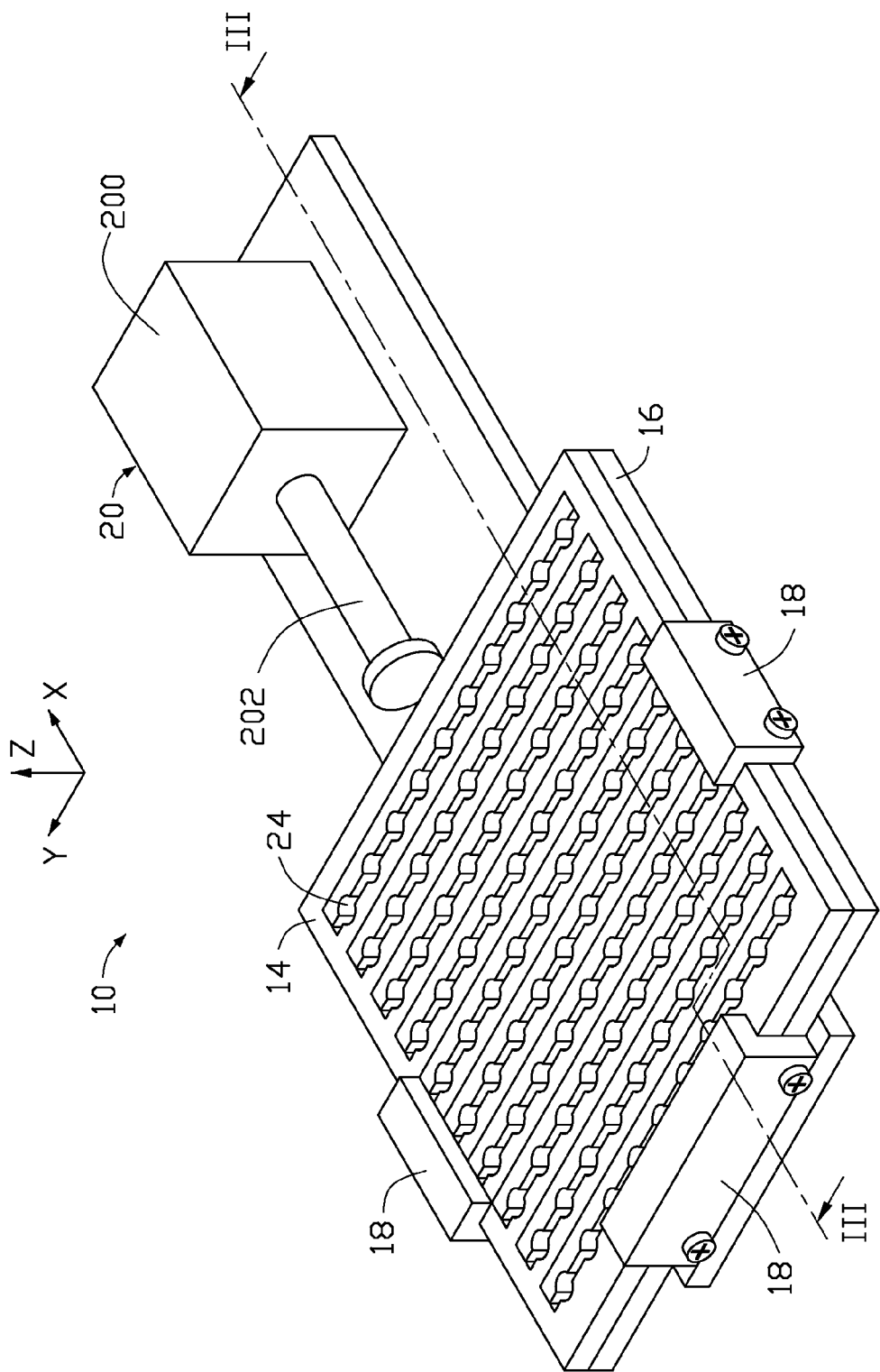
FIG. 2 is a perspective view of the apparatus shown in FIG. 1.

Referring to FIG. 1 and FIG. 2, an apparatus 10 for holding lens holders, according to a first present embodiment, includes a table 12, a first board 14, a second board 16, at least one securing member 18, and a driving device 20.

The first board 14 and the second board 16 are substantially rectangular shaped. The first board 14 includes a first frame 140, a second frame 141, and a plurality of paralleled separators 144. In the present embodiment, the number of the separators 144 is N (N is a natural number). The first frame 140 is parallel with the second frame 141. The separators 144 are disposed between and perpendicular to both the first frame 140 and the second frame 141. The separators 144 are evenly spaced from each other. The first frame 140, the second frame 141, and the separators 144 are substantially long cubic shaped. The first frame 140 and the second frame 141 can be integrally formed with the separators 144.

A plurality of slots 146 is defined between each adjacent separators 144. In the present embodiment, the number of the slots 146 is N−1. The slots 146 run through both the top surface and the bottom surface of the first board 14.

One surface of each of the separators 144 facing to adjacent separators 144 is defined as a first holding surface 1440. Each of the first holding surfaces 1440 is defined on the same side of each of the separators 144. A plurality of circular arc grooves 1442 are formed on each of the first holding surfaces 1440. In the present embodiment, the number of the grooves 1442 on each first holding surface 1440 is M (M is a natural number). The grooves 1442 extend regularly and periodically in a direction perpendicular to the extending direction of both the separator 144 and the surface of the first board 14.

The second board 16 includes a rectangular shaped substrate 160. The substrate 160 is supported by the table 12. A plurality of blocks 162 extends out from the top surface of the substrate 160. In the present embodiment, the number of the blocks 162 is N−1. The extending direction of the blocks 162 is parallel to one side of the substrate 160. The arrangement and size of the blocks 162 on the second board 16 are corresponding to those of the slots 146 in the first board 14. The width of each block 162 is smaller than that of each slot 146. The length of each block 162 is smaller than or equal to that of each slot 146.

A surface of each of the blocks 162 facing to adjacent blocks 162 is defined as a second holding surface 1620. Each of the second holding surfaces 1620 is on the same side of each of the blocks 162. A plurality of circular arc grooves 1622 are formed on each of the second holding surfaces 1620.

In the present embodiment, the number of the grooves 1622 on each second holding surface 1620 is M (M is a natural number). The grooves 1622 extend regularly and periodically in a direction perpendicular to the extending direction of both the block 162 and the surface of the substrate 160. The size of the groove 1622 is similar with that of the groove 1442 in the separators 144. The distance between adjacent grooves 1622 is corresponding to that of the grooves 1442.

The blocks 162 of the second board 16 and the slots 146 of the first board 14 are in one-to-one correspondence. The first board 14 and the second board 16 are joined together by inserting blocks 162 into the slots 146. The second holding surfaces 1620 face to the first holding surfaces 1440. The grooves 1442 on the first holding surface 1440 and the corresponding grooves 1622 on the second holding surface 1620 cooperatively define a plurality of sockets 24 (refer to FIG. 2). In the present embodiment, the sockets 24 are arranged in an M by N−1 (M×(N−1)) array in an equally spaced relationship.

The securing member 18 includes a first plate 180 and a second plate 182 perpendicular to the first plate 180, i.e., the securing member 18 is L shaped. The first plate 180 is attached on the table 12. The second plate 182 is parallel to the table 12. The second plate 182 is configured for limiting the movement of the first board 14 in the direction along Z-axis. The second holding surfaces 1620 are set facing to the first plate 180. One end of the substrate 160 opposite to the first plate 180 is attached on the first plate 180 by screws 184. The first holding surfaces 1440 are facing in an opposite direction from the first plate 180. One end of the first board 14 is connected with the first plate 180 by elastic elements, such as elastic spring or elastic trip. In the present embodiment, the elastic elements are two elastic springs 186. Two spring holes 142 are defined in the first board 14 opposite to the first plate 180 adapted for holding the elastic springs 186. The depth of the two spring holes 142 are larger than or equal to the compressed length of the elastic springs 186. The securing member 18 can also be secured on other two sides of the second board 16 for limiting the movement of the first board 14 in the direction along Y-axis. The material of the first board 14 and the second board 16 is selected from the group consisting of metal, wood, plastic, etc.

The driving device 20 is secured on the table 12 and opposite to the other end of the first board 14 relative to the securing member 18. In the present embodiment, the driving device 20 is a gas cylinder 200. The gas cylinder 200 includes a connecting rod 202 connected with the pistons (not shown) inside the gas cylinder 200. The connecting rod 202 is connected or in contact with the end of the first board 14 opposite to the driving device 20. The connecting rod 202 is configured for driving the first board 14 to move relative to the second board 16 linearly. In the alternative embodiments, the driving device 20 can be a step motor or other cylinder.

Figure 3:
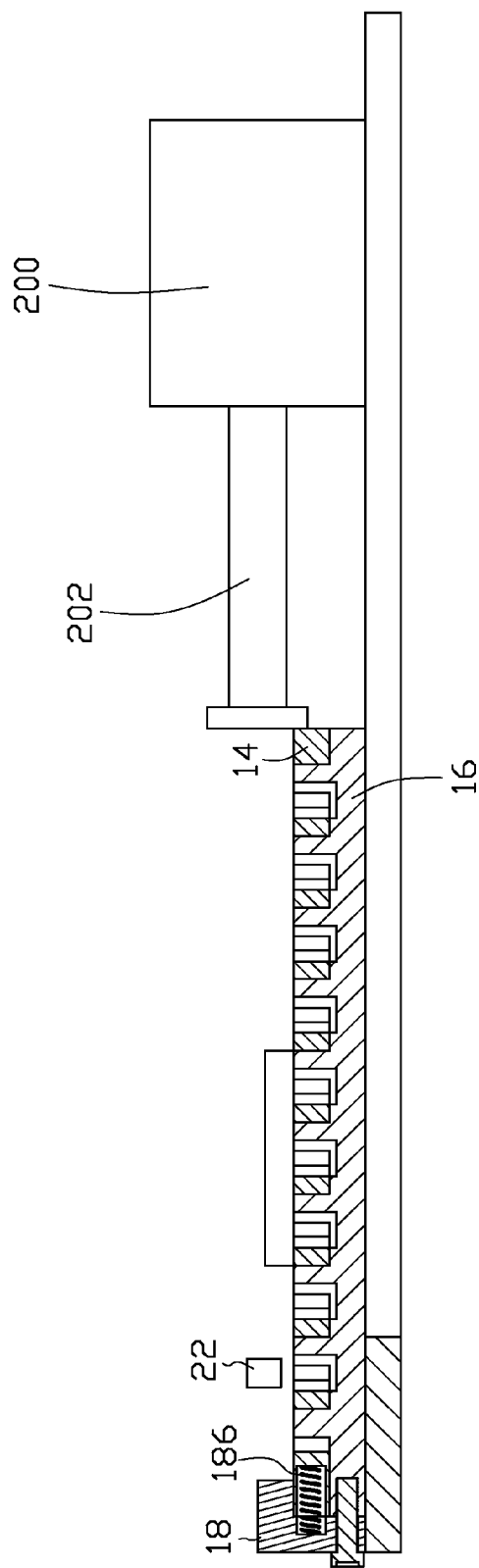
FIG. 3 is a cross-sectional view taken along line III-III of FIG. 2.
Figure 4:
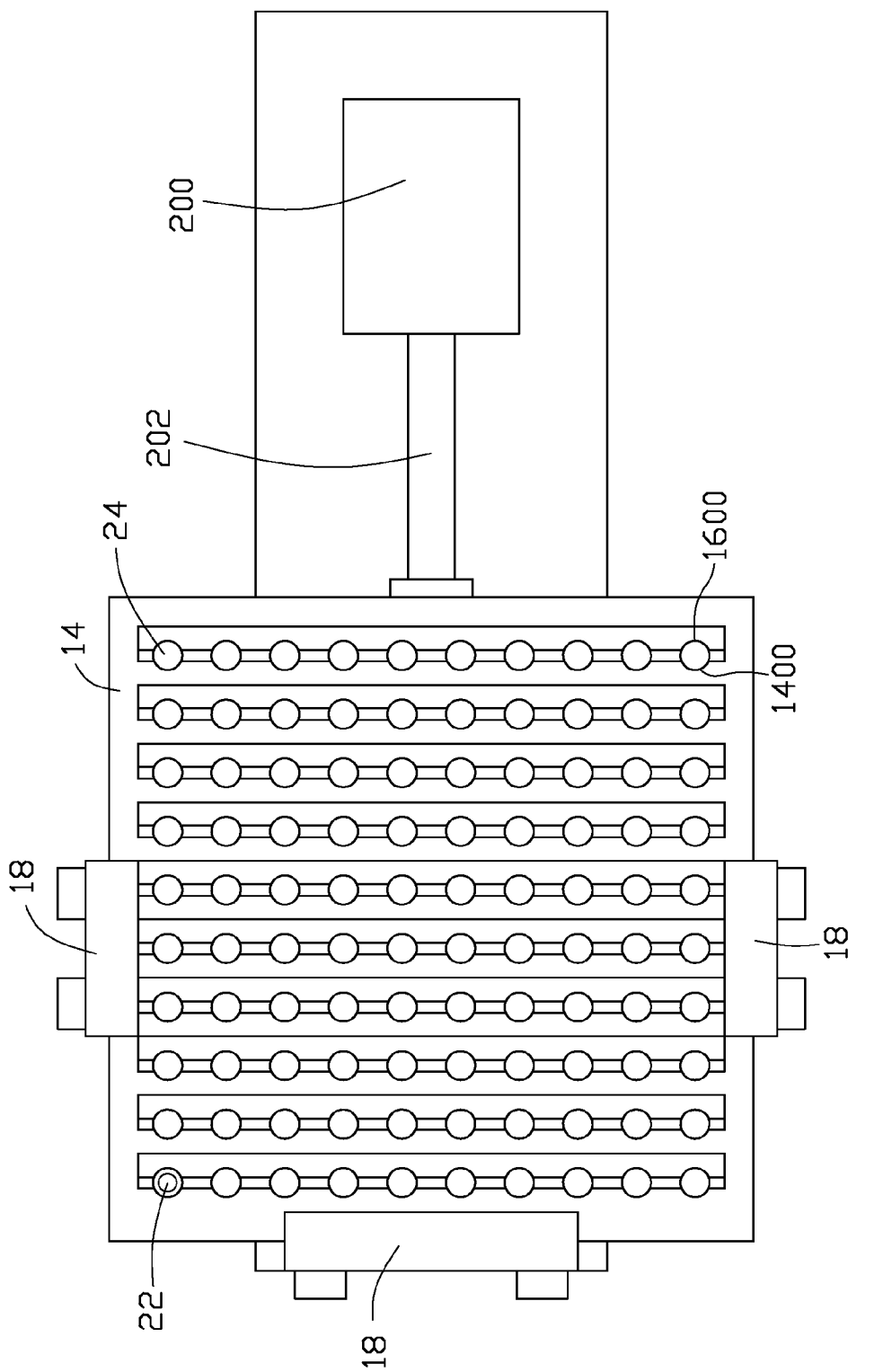
FIG. 4 is a top view of the apparatus in accordance with the first embodiment before the lens holder being held by the apparatus.

The operation principle of the apparatus 10 is described as follows. Referring to FIGS. 3 and 4, firstly, the first board 14 is driven by the gas cylinder 200 to move towards the securing member 18 relative to the second board 16. The springs 186 are compressed, whereby potential energies are stored in the springs 186. The gas cylinder 200 stops working when the sockets 24 are large enough to hold the lens holder 22 (figures only show one lens holder, the number of the lens holders can be smaller than or equal to (N×(M−1))). And then, the lens holder 24 can be placed into one of the sockets 24 automatically by robotic arms.

Figure 5:
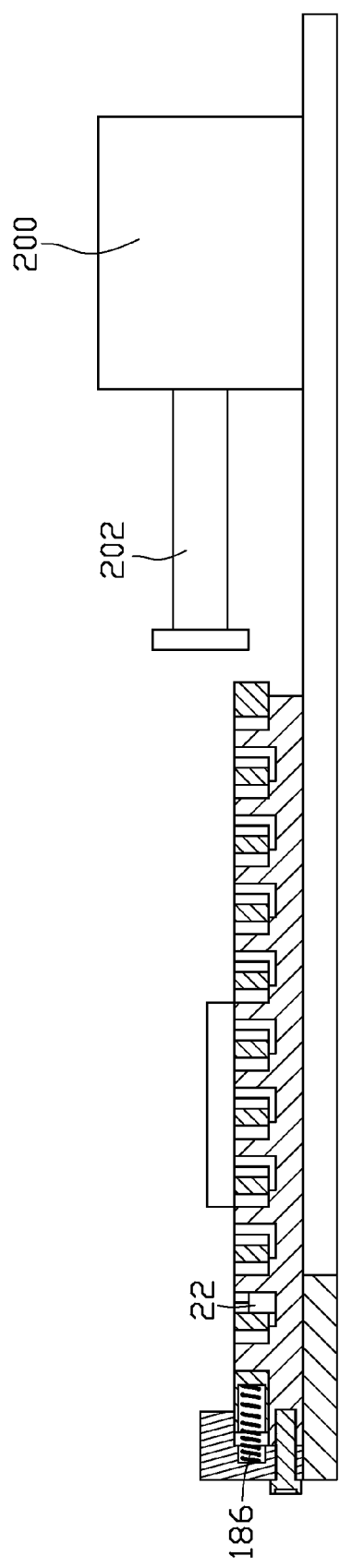
FIG. 5 is a cross-sectional view of the apparatus in accordance with the first embodiment when the lens holder is held by the apparatus.
Figure 6:
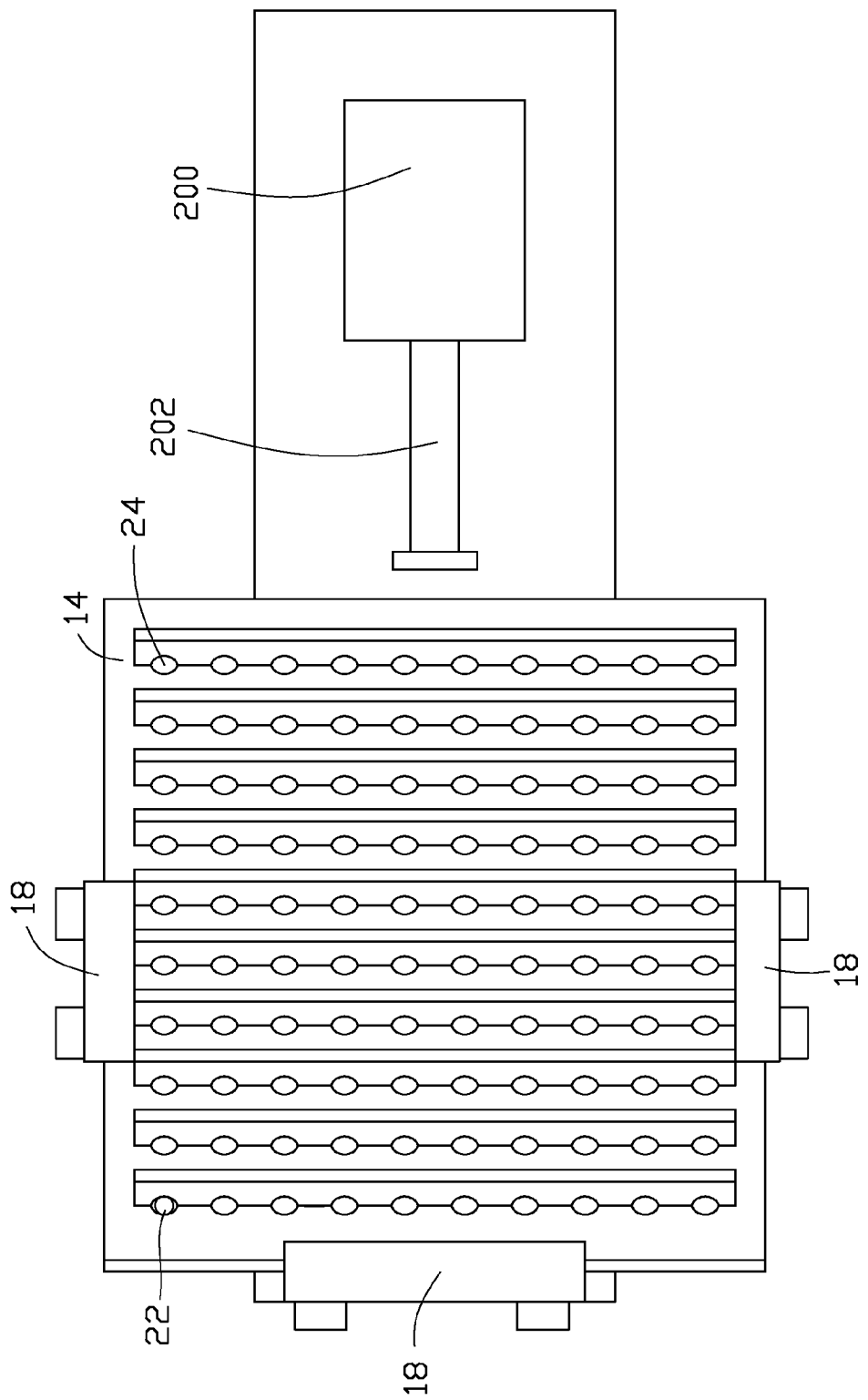
FIG. 6 is a top view of the apparatus in accordance with the first embodiment when the lens holder is held by the apparatus.

Secondly, referring to FIGS. 5 and 6, the connecting rod 202 is pulled back by the gas cylinder 200, and the first board 14 is pushed by the springs 186 to move towards the driving device 20. In this way, the lens holder 22 is held tightly by the first holding surface 1440 and second holding surface 1620. After the lens holder 22 being assembled, the first board 14 is driven by the gas cylinder 200 to move towards the securing member 18 again. And then, the space of the sockets 24 becomes large enough for the lens holder 22 to be picked up by the robotic arms.

It is to be understood that, in the alternative embodiments, the second board 16 can be secured on the table 12 by adhesives or nails.

Figure 7:
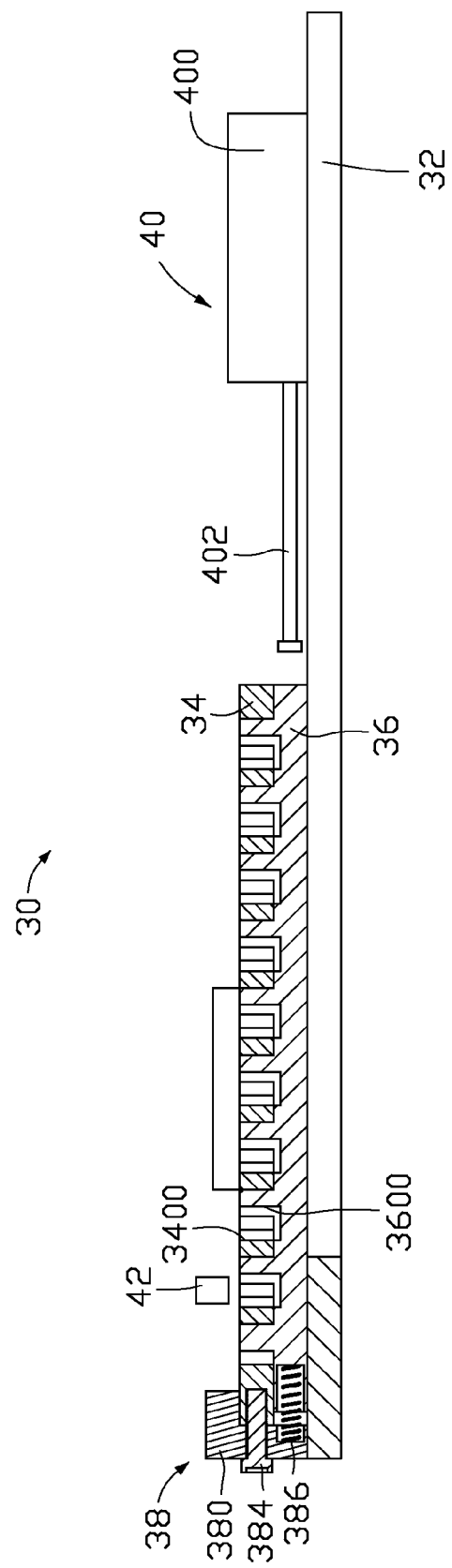
FIG. 7 is a cross-sectional view of the apparatus in accordance with a second embodiment before the lens holder being held by the apparatus.

Referring to FIG. 7, an apparatus 30 for holding lens modules, according to a second present embodiment is illustrated. The structure of the apparatus 30 is similar to that of the apparatus 10 in the first embodiment. The apparatus 30 includes a table 32, a first board 34, a second board 36, a securing member 38, and the driving device 40. Similar to the apparatus 10, the first board 34 includes a plurality of first holding surfaces 3400. The second board 36 includes a plurality of second holding surfaces 3600. The driving device 40 is a gas cylinder 400 having a connecting rod 402. The difference between the apparatus 30 in the second embodiment and the apparatus 10 in the first embodiment is that, in the second embodiment, one end of the second board 36 is connected with the first plate 380 of the securing member 38 by two springs 386, one end of the first board 34 opposite to the first plate 380 is attached on the first plate 380 by screws 384, and the connecting rod 402 is connected or in contact with the second board 36 opposite to the driving device 40.

Referring to FIG. 7 again, in the initial status of the apparatus 30, due to the force of the springs 386, the space between the first holding surface 3400 and the second surface 3600 is large enough to place the lens holder 42 therein.

Figure 8:
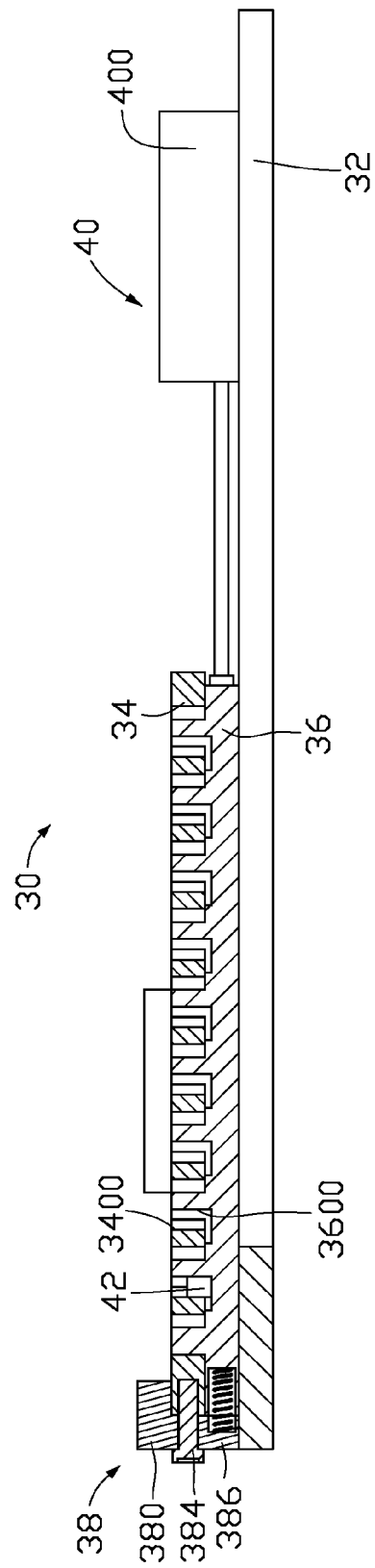
FIG. 8 is a cross-sectional view of the apparatus in accordance with the second embodiment when the lens holder is held by the apparatus.

Referring to FIG. 8, the second board 36 is driven by the gas cylinder 400 to move towards the securing member 38 relative to the first board 34, and then, the lens holder 22 is held tightly by the first surface 3400 and the second surface 3600.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. An apparatus for holding lens holders, comprising:
    a first board comprising a plurality of through slots defined therein, the first board having a first inner surface and an opposite second inner surface in each of the slots, a plurality of spaced grooves defined in each of the first inner surfaces;
    a second board comprising a base portion, a plurality of elongated protrusions for insertion in and sliding in the respective slots, the protrusions extending from the base portion, each of the protrusions having a first surface facing the corresponding first inner surface, an opposite second surface facing the corresponding second inner surface, and a plurality of grooves defined in the first surface, the grooves of the protrusions aligned with the respective grooves in the first inner surface; and
    the first board and the second board attached to each other with the protrusions inserted in the slots, the first board and the second board cooperatively forming a plurality of receptacles between the first inner surfaces in the slots and the first surface of the protrusions;

a platform with one of the first board and the second board secured thereon; and a driving device for driving the other one of the first board and the second board to move relative to the one secured on the table to change a size of the receptacles.

2. The apparatus as described in claim 1, wherein the first board and the second board are rectangular shaped.

3. The apparatus as described in claim 1, wherein the first board has a uniform thickness.

4. The apparatus as described in claim 1, wherein the first inner surfaces in the slots are substantially parallel to each other.

5. The apparatus as described in claim 1, wherein the grooves in each first inner surface are semicircular grooves.

6. The apparatus as described in claim 5, wherein the size of the grooves of the protrusions is substantially equal to that of the grooves in the first inner surfaces.

7. The apparatus as described in claim 1, wherein a width of each protrusion is less than that of each slot.

8. The apparatus as described in claim 1, wherein the grooves in each first inner surface in the slots are parallel to each other.

9. The apparatus as described in claim 1, wherein the grooves in the protrusions are parallel to each other.

10. The apparatus as described in claim 1, further comprising a securing member disposed on an opposite side of the combined first board and second board to the driving device and configured for securing the first board or the second board on the platform.

11. The apparatus as described in claim 10, wherein a first end of the first board is attached on the securing member and a first end of the second board is resiliently engaged with the securing member.

12. The apparatus as described in claim 11, wherein the driving device is configured for pressing an opposite second end of the second board.

13. The apparatus as described in claim 10, wherein a first end of the second board is attached on the securing member and a first end of the first board is resiliently engaged with the securing member.

14. The apparatus as described in claim 13, wherein the driving device is configured for pressing an opposite second end of the first board.

\* \* \* \* \*